Feb. 12, 1957 D. L. McKAY 2,781,294
APPARATUS AND PROCESS FOR THE SEPARATION
AND PURIFICATION OF WAX
Filed Sept. 4, 1953 2 Sheets-Sheet 1

INVENTOR.
D. L. MC KAY
BY *Hudson & Young*
ATTORNEYS

United States Patent Office 2,781,294
Patented Feb. 12, 1957

2,781,294

APPARATUS AND PROCESS FOR THE SEPARATION AND PURIFICATION OF WAX

Dwight L. McKay, Bartlesville, Okla., assignor to Phillips Petroleum Company, a corporation of Delaware Application September 4, 1953, Serial No. 378,542

13 Claims. (Cl. 196—17)

This invention relates to the separation and purification of wax from waxy oils. In one of its more specific aspects, it relates to a crystallization process for the separation and purification of wax from waxy oils wherein oil-free waxes and low pour point lubricants are produced. In another of its more specific aspects, it relates to a process wherein any pour depressant present in the waxy oils is recovered separately from the oil-free wax.

In order to provide an oil having high lubricating value, it is desirable to produce a low pour point lubricant which can be used over a comparatively wide range of temperatures. The term "pour point" refers to the temperature at which an oil congeals, and the presence of wax in lubricants has an adverse effect upon their pour point characteristics. Because many of the crude oils, such as paraffin base and many of the mixed base and asphalt base crude oils from which lubricating oil fractions are produced, contain wax, it becomes necessary to provide a method for separating the wax in order to obtain low pour point lubricants.

Numerous methods appear in the literature for effecting the separation of wax from waxy oils so as to recover low pour point lubricating oil and wax. In one of the early methods of separation, the waxy oil is first diluted with a light hydrocarbon such as kerosene, gasoline or naphtha and then passed into a large cooling vessel where the diluted oil and wax is chilled for an extended period of time until a separation of the wax from the oil occurs. Thereafter, the cold solution of oil and precipitated wax is allowed to stand for a period of several weeks or until the wax settles to the bottom of the cooling vessel. This method for dewaxing oil has numerous disadvantages among which may be mentioned the large refrigeration facilities required, the inefficient separation obtained because of the large amount of oil contained in the precipitated wax and the large amount of storage space required.

In another method for separating wax from waxy oils, after dissolving the oil in a solvent at an elevated temperature, the solution is cooled to a temperature sufficient to precipitate the wax which is subsequently removed by filtration, settling or centrifuging. The solvents used are those which show a preferential solubility for oil over wax at the dewaxing temperature, such as various mixtures of benzene and acetone, benzene and methyl ethyl ketone, propane, naphtha, and the like. With certain types of oil and solvents, a pour depressant or crystallization regulator is added to the oil prior to cooling in order to obtain a slurry which can be filtered or otherwise separated. Since the wax obtained in this process contains a large percentage of oil, the wax is ordinarily subjected to a sweating process in order to remove the oil. The pour depressant usually remains with the crystalline wax which must be treated with sulphuric acid and/or clay in order to obtain a marketable wax product. The separation effected utilizing the aforementioned method is slow and inefficient and requires an extensive installation.

In general, the prior art processes are characterized by difficulties encountered in eliminating the oil and impurities from the wax so as to obtain a marketable product. In accordance with this invention, a process of wax separation is provided which utilizes a minimum of equipment and gives in a rapid and efficient manner a high purity wax product suitable for commercial use.

The following objects of the invention will be attained by the various aspects of the invention.

It is an object of the present invention to provide a crystallization process for the separation and purification of wax from waxy oils wherein oil-free waxes and low pour point lubricants are produced.

Another object is to provide crystallization apparatus for use in a process for the separation of wax from waxy oil.

Still another object is to provide a wax separation and purification process which utilizes a displaced reflux stream of molten wax to wash occluded impurities and oil from the crystalline wax.

A further object is to provide a wax separation and purification process wherein any pour depressant present in the waxy oil is recovered separately from the oil-free wax.

A still further object is to provide a process for the separation and purification of wax from waxy oils which gives a high purity product at an economical and rapid rate while using a minimum of equipment.

Still other objects and advantages will become apparent to those skilled in the art from the following disclosure.

Broadly speaking, the present invention is directed to the purification of wax and involves moving a mass of wax crystals through a purification zone and melting the crystals in a portion of that zone. At least a part of the resulting melt is passed through the moving mass of crystals as reflux so as to remove occluded impurities from the crystals. The remainder of the melt is withdrawn from the purification zone as purified wax product.

In a more specific aspect of the invention, a wax-containing oil is chilled to a temperature sufficient to crystallize the wax. With certain types of oils, it may be necessary to add a small amount of pour depressant prior to chilling in order to obtain the desired crystal slurry. The slurry is then introduced into a crystal purification column provided with a plurality of filters and having a melting zone in its downstream end with respect to crystal movement. A wax-free oil is withdrawn from the column through a filter disposed in the upstream portion of the purification column, with respect to crystal movement, so as to form therein a uniform, contiguous mass of wax crystals. The mass of crystals is moved through the column toward the melting zone which is maintained at a temperature sufficient to melt the wax crystals. A portion of the resulting melt is displaced as a reflux stream through the column countercurrently to the movement of crystals and in intimate contact therewith so as to remove occluded impurities from the crystals. The reflux stream comprising oil and wax is withdrawn from the column through a filter positioned in the column downstream crystalwise from the first mentioned filter. If a pour depressant was added to the oil prior to chilling, the reflux stream will contain the pour depressant, or by utilizing another filter in the column a stream comprising oil and pour depressant can be recovered separately. The remainder of the melt is withdrawn from the melting zone as a high purity, oil-free wax product.

For a more complete understanding of the invention, reference may be had to the drawing, in which.

Figure 1:
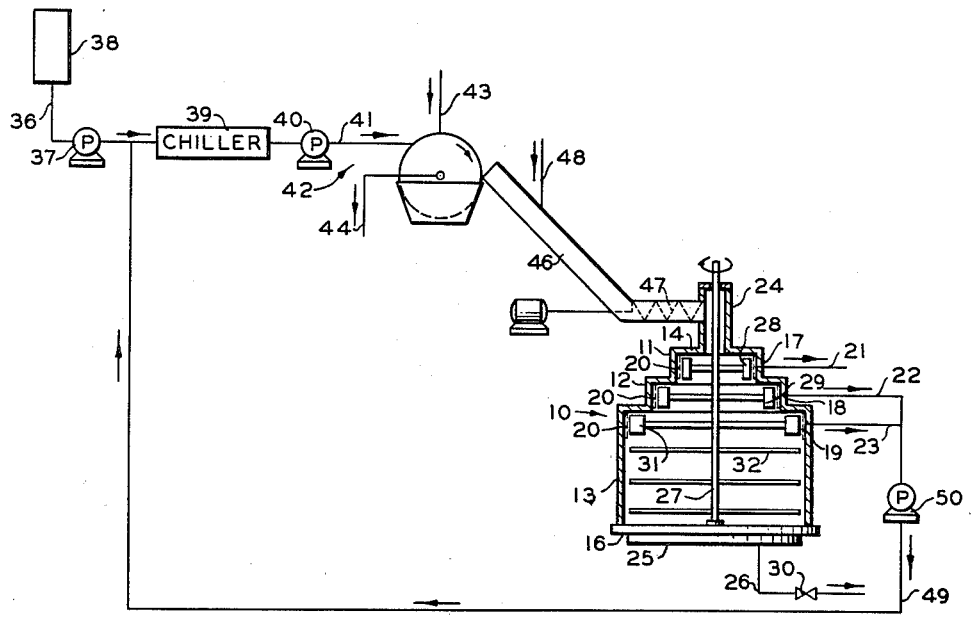
Figure 1 is a diagrammatic elevational view, partly in section, of one arrangement of the apparatus of the invention.

Referring to the drawings and in particular to Figure 1, crystal purification column 10 comprises three substantially upright tubular members 11, 12 and 13 having progressively larger diameters in the order as numbered from top to bottom. Tubular members 11 and 13 are closed by upper and lower closure members 14 and 16, respectively. Filter sections positioned in the upper portion of each of the tubular members and designated by reference numerals 17, 18 and 19 comprise substantially cylindrical screens 20 disposed within and adjacent the walls of the tubular members. Liquid outlet lines 21, 22 and 23 are connected to filter sections 17, 18 and 19, respectively. Crystal inlet conduit 24 closed at its upper end extends from upper closure member 14 while a heat exchange means is positioned next to lower closure member 16. As illustrated, the heat exchange means is an electrical heater 25, but other means may be employed as, for example, a coil through which a heat transfer medium is circulated can be disposed wtihin or adjacent column 10 at its lower end. Outlet line 26 connected to the lower end of column 10 and containing valve 30 provides means for withdrawing a controlled amount of liquid from the column. A vertical shaft 27 centrally disposed within column 10 is operatively connected to a motor, not shown. Filter scraper blades 28, 29 and 31, attached to vertical shaft 27 and positioned in close proximity to the filter screens of filter sections 17, 18 and 19, respectively, are adapted to prevent clogging of the filter screens with crystals. A plurality of radial stirrer rods 32 are attached at spaced intervals to a portion of shaft 27 disposed within tubular member 13.

Feed inlet line 36 containing pump 37 connects tank 38 to chiller 39 while line 41 containing pump 40 leads from the chiller to rotary filter 42. Line 43 positioned above rotary filter 42 provides means for spraying a wash liquid or solvent thereon while line 44 provides means for withdrawing liquid from the filter. Conduit 46 provided with a means for moving crystals therethrough such as auger 47 in its lower portion leads from rotary filter 42 to crystal inlet conduit 24. Line 49 containing pump 50 provides means for recycling liquid to chiller 39.

Figure 2:
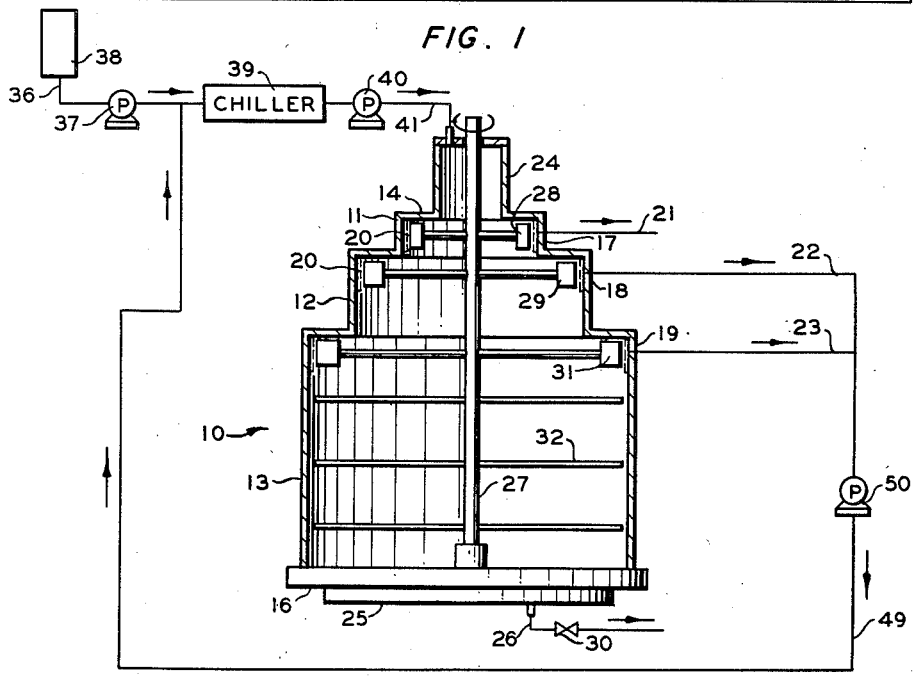
Figure 2 is a diagrammatic elevational view, partly in section, of a modification of the apparatus of the invention.

Referring to Figure 2, the apparatus illustrated is the same as that shown in Figure 1 except that the rotary filter has been omitted so that line 41 leads directly from chiller 39 to crystal inlet conduit 24. Identical reference numerals have been used in conjunction with Figure 2 to designate corresponding elements as described in relation to Figure 1. While the crystal purification columns of Figures 1 and 2 are shown as comprising tubular sections of varying cross-sectional areas, it is not intended to so limit the invention. Accordingly, it is within the scope of the invention to utilize a column substantially in the shape of an elongated cylinder.

Figure 3:
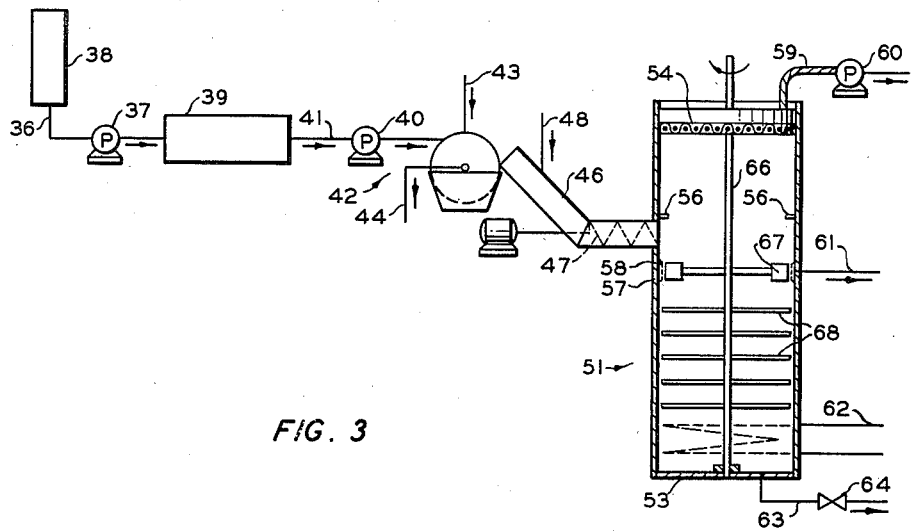
Figure 3 is a diagrammatic elevational view, partly in section, of another modification of the apparatus of the invention.

With reference to Figure 3, crystal purification column 51 comprises a substantially vertical tube closed at its lower end by closure member 53. Floating roof filter 54 comprising a horizontal filter screen is disposed in the upper portion of column 51 which is provided with stops 56 for limiting the distance the filter can move in the column. Filter 54 is so weighted that it will ride on the crystalline wax introduced into the column, the oil and solvent being thereby forced through the filter screen. Filter section 57 positioned intermediate the ends of column 51 comprises a substantially cylindrical filter screen 58 positioned within column 51. Liquid outlet line 59 comprising a flexible hose and containing pump 60 extends from the upper end of column 51 above filter 54 while liquid outlet line 61 is connected to filter section 57. Disposed in the lower end of column 51 is a heat exchange means 62 which is illustrated as being a coil through which a heat transfer medium is circulated. It is within the contemplation of the invention to utilize other heat exchange means as, for example, an electrical heater as explained in conjunction with Figure 1. Outlet line 63 connected to the lower end of column 51 and containing valve 64 provides means for withdrawing a controlled amount of liquid from the column. A vertical shaft 66 centrally disposed within column 51 is operatively connected to a motor, not shown. Filter scraper blades 67 attached to vertical shaft 66 and positioned in close proximity to filter screen 58 of filter section 57 are adapted to prevent clogging of the filter screen with crystals. A plurality of radial stirrer rods 68 are attached to the portion of shaft 66 below filter section 57. Other items of equipment shown in Figure 3 are similar to those described in conjunction with Figure 1, and have been designated with identical reference numerals. Inlet conduit 46 communicates with column 51 at a point intermediate its ends and between stops 56 and filter section 57.

When practicing the process of this invention utilizing the apparatus of Figure 1, a waxy oil maintained in tank 38 at a temperature above its congealing point is withdrawn through line 36 and pumped by pump 37 into chiller 39. The waxy oil is cooled in the chiller to a sufficiently low temperature to crystallize substantially all of the wax contained in the oil-wax mixture. The resulting slurry is pumped from the chiller through line 41 by pump 40 and passed to rotary filter 42 where the wax is separated from the oil forming a wax cake upon the filter. The wax cake is washed with a solvent passed onto the rotary filter through line 43 in order to remove oil from the wax. As a solvent it is preferred to use such poor wax solvents as methyl ethyl ketone, butyl, amyl or propyl alcohol or mixtures thereof, various esters such as ethyl acetate, ethers such as diethyl ether or isopropyl ether, chlorinated hydrocarbons such as ethylene dichloride, trichloroethylene, and other ketones such as acetone, methyl n-propyl, methyl isopropyl ketone, methyl isobutyl ketone, ethyl isopropyl ketone, methyl n-butyl ketone, and the like. The wax-free oil and solvent are withdrawn from the filter through line 44 and thereafter sent to means not shown for separating the oil and solvent. While a rotary filter has been specifically illustrated, it is not intended to so limit the invention since any conventional filter, for example, a centrifugal filter, can be used to effect the desired separation. The filter cake is scraped from rotary filter 42 and passed through conduit 46 into crystal inlet conduit 24. By means of auger 47, which is being rotated by a motor, the crystalline wax containing oil and solvent and occluded impurities is forced into crystal purification column 10 through conduit 24. In order to ensure that the wax will pass freely through conduit 46, solvent can be introduced into the conduit through line 48 so as to form a slurry therein.

The crystalline wax flows downwardly through crystal inlet conduit 24 and enters crystal purification column 10 in the upper portion of which filter section 17 is located. In filter section 17, the wax is separated from the oil and solvent which are withdrawn from the column through outlet line 21. The wax-free oil and solvent are thereafter passed to means, not shown, for separating the oil and solvent. The wax crystals continue to move downwardly through column 10 toward the high temperature end by the combination of the force of gravity and the force exerted by the crystals or slurry being forced into the top of the column.

On reaching the melting zone maintained in the lower end of column 10 by electrical heater 25, the crystalline wax is melted, and a portion only of the resulting melt is withdrawn through line 26 while the remainder of the molten wax is displaced upwardly as a reflux stream through the downwardly moving mass of crystalline wax and in intimate contact therewith. The reflux stream passes countercurrently to the downward movement of wax through the combined effect of withdrawing only a portion of the melt from crystal purification column 10 and the liquid displacing action of the mass of crystalline wax moving downwardly as a result of the force of gravity and the force exerted by the wax or slurry introduced into the top of the column. Thus, in moving down the column, the crystalline wax is subjected to the washing action of the reflux stream which effectively removes therefrom any oil and occluded impurities contained therein so that it is possible to recover a substantially pure oil-free wax product through line 26.

The reflux stream is withdrawn from column 10 through lines 22 and 23 connected to filter sections 18 and 19, respectively. With certain types of oils, a pour depressant or crystallization regulator is added to the oil prior to cooling in order to obtain a slurry which can be filtered. Pour depressants which can be added include asphalt, oxidized wax, condensation products of chlorinated waxes with benzene, napthalene, or other aromatic compounds, stearene pitch, cracked residuum pitch, highly polymerized olefins, unoxidized or oxidized degras of lanolin wool grease or mixtures thereof. Since the pour depressant forms an envelope around the crystalline wax, it is washed off the crystals first by the reflux stream and can be removed from the column through line 22 along with oil contained in the wax. A stream comprising wax and oil is recovered through line 23, and, if pour depressant has not been added, a wax and oil stream is also recovered through line 22. Alternatively, if pour depressant has not been added, either one of the filter sections 18 or 19 can be omitted from the crystal purification column. Lines 22 and 23 are both connected to line 49 containing pump 50 to provide means, if desired, whereby the liquid removed from the column through these two lines can be recycled to chiller 39.

During the operation of the purification column, shaft 27 is slowly rotated, thereby turning scraper blades 28, 29 and 31 and stirrer rods 32. The rotating scraper blades prevent wax crystals from blocking the filter screens of the filter sections, thus ensuring free passage of liquid therethrough. By slowly and continuously stirring the mass of crystalline wax, the crystals are maintained as a uniform mass, and channelling of the reflux stream therethrough is inhibited.

In a preferred embodiment of the invention as illustrated in Figure 2, a slurry resulting from cooling a waxy oil to a sufficiently low temperature to crystallize substantially all of the wax contained therein is passed directly from chiller 39 into crystal inlet conduit 24 under pressure developed by pump 40 which is of a type capable of handling solids. A Moyno pump as manufactured by Robbins & Myers, Inc., Springfield, Ohio, a gear pump, or a diaphragm pump are examples of pumps capable of handling solids which can be advantageously employed with the apparatus of Figure 2. The slurry flows downwardly through crystal inlet conduit 24 and enters crystal purification column 10 in the upper portion of which filter section 17 is located. In filter section 17, a wax-free oil is separated from the slurry and withdrawn from the column through outlet line 21 while the resulting mass of wax crystals containing oil and occluded impurities is moved downwardly through column 10 toward the high temperature end by the combination of the force of gravity and the hydraulic force exerted by the slurry entering the top of column 10. A portion of the melt resulting from melting the crystalline wax in the melting zone maintained in the lower end of column 10 by electrical heater 25 is withdrawn through line 26 while the remainder of the molten wax is displaced upwardly as a reflux stream through the downwardly moving mass of crystals. The reflux stream subjects the crystals to a washing action as explained in conjunction with Figure 1 so that a substantially pure oil-free wax product is recovered through line 26. If a pour depressant has been added to the waxy oil prior to chilling, a stream comprising oil and pour depressant is withdrawn through filter section 18 by means of line 22 while a stream comprising wax and oil is recovered from filter section 19 through line 23. If a pour depressant has not been used, both streams removed from column 10 through lines 22 and 23 will comprise wax and oil, or alternatively one of the filter sections 18 or 19 can be omitted from the crystal purification column. The streams recovered through lines 22 and 23 can be recycled to chiller 39 by means of line 49. As explained in conjunction with Figure 1, scraper blades are continuously scraping the filters, and stirrer rods are slowly stirring the crystals contained in the crystal purification column.

In the operation of the apparatuses of Figures 1 and 2, the crystal mass is moved through the purification column by the combination of the force of gravity and the force exerted by the crystals or slurry entering the top of the column. Since the wax crystals may have a tendency to stick in the column if a mechanical means is used to force the crystal mass through the column, it is preferred to operate in this manner. It is to be understood, however, that it is within the scope of the invention to employ a positive displacement means such as a piston or auger to move the crystals.

In another modification of the invention as shown in Figure 3, a wax filter cake, formed on rotary filter 42 in the same manner as explained in relation to Figure 1, is discharged from the filter through conduit 46. By means of auger 47 the crystalline wax containing oil and solvent and occluded impurities is forced into crystal purification column 51 at a point intermediate its ends. A solvent can be introduced into conduit 46 through line 48 so as to form a slurry in order to ensure that the wax will flow freely through the conduit. Foating roof filter 54 rides on top of the crystalline wax so that oil and wash solvent rise through the filter screen, thus effecting a separation of the wax from the oil and solvent. By means of pump 60, the oil and wash solvent are pumped from the column through line 59 and thereafter passed to means, not shown, for separating oil and solvent. The crystalline wax moves downwardly through column 51 toward the high temperature end by the combination of the force of gravity, the force exerted by the wax being forced into the column, and the weight of floating roof filter 54.

On reaching the melting zone maintained in the lower end of column 51 by heat exchange means 62, the crystalline wax is melted and a portion only of the resulting melt is withdrawn through line 63 while the remainder of the molten wax is displaced upwardly as a reflux stream through the downwardly moving mass of crystalline wax. The reflux stream subjects the crystals to a washing action as discussed in conjunction with Figure 1 so that a substantially pure oil-free wax product is recovered through line 63. The reflux stream comprising oil and wax is withdrawn from column 51 through filter section 57 by means of line 61, and can thereafter, if desired, be recycled to chiller 39. If a pour depressant has been added to the waxy oil prior to chilling, a stream comprising wax, oil and pour depressant is recovered from column 51 through line 61, or alternatively a second filter section can be included in the column so that separate streams comprising oil and pour depressant, and wax and oil are withdrawn from the column through two lines as explained in conjunction with Figures 1 and 2. As discussed in relation to Figure 1, scraper blades 67 are continuously scraping the filters while stirrer rods 68 are slowly stirring the crystals contained in the crystal purification column.

While the crystal purification apparatuses of the present invention have been described with a certain degree of particularity, it is within the contemplation of the invention to employ other systems which utilize a displaced reflux stream and thereby obtain a substantially pure oil-free wax product as well as a wax-free oil. Other systems which use such a displaced reflux stream are disclosed by P. M. Arnold in U. S. Patent No. 2,540,977, by J. Schmidt in U. S. Patent No. 2,617,274, and in my copending U. S. application, Serial No. 375,850, filed August 24, 1953. It is not intended, however, to limit the invention to fractional crystallization apparatus using a displaced reflux stream, but rather any crystal purification apparatus employing crystal melt as a reflux can be adapted to practice the process of this invention. It is also within the scope of the invention to utilize a crystal purification apparatus wherein crystalline wax is introduced into a column intermediate its end, the column having a cooling zone in one end and a melting zone in its other end so that enriching and stripping sections are provided in the unit.

It is preferred to practice the process of this invention without the addition of a solvent or wash liquid. As explained previously, Figure 2 illustrates a preferred embodiment of the invention wherein a slurry is passed directly from the chiller into the purification column. Similarly, the rotary filter of Figure 3 can be omitted and the slurry can be passed directly from the chiller into the purification column as in Figure 2.

Figure 4:
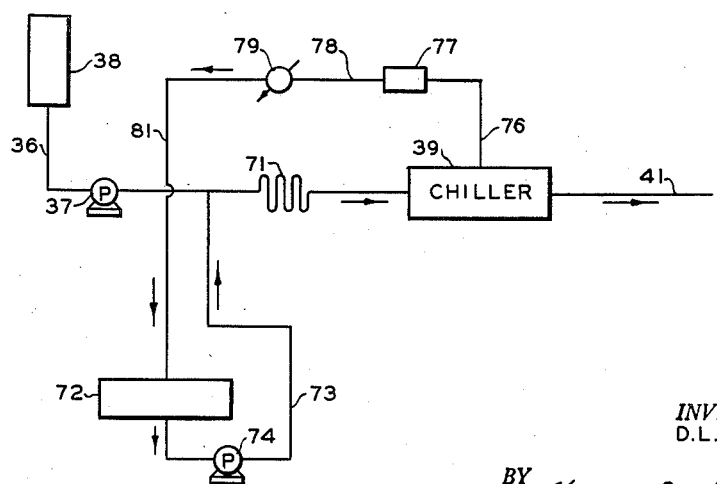
Figure 4 illustrates by means of a flow diagram a modification of the invention wherein a normally gaseous hydrocarbon is used as a solvent.

It is within the scope of the invention, however, to add a solvent to the waxy oil prior to its introduction into the chiller. This aspect of the invention is illustrated in Figure 4 wherein a normally gaseous hydrocarbon such as propane is utilized as the solvent. A waxy oil maintained at above its congealing point in tank 38 is withdrawn through line 36 and sent by means of pump 37 into agitator 71 where the waxy oil is dissolved in liquid propane coming from tank 72 by means of line 73 and pump 74. The waxy oil dissolved in liquid propane passes from agitator 71 into chiller 39 where the waxy oil is cooled to a temperature sufficiently low to crystallize substantially all of the wax by allowing a portion of the liquid propane to vaporize under reduced pressure through line 76. The vaporized propane then passes into compressor 77 where the gas is compressed and thereafter introduced into condenser 79 through line 78 where it is liquefied. The condensed propane is then returned to tank 72 by means of line 81. Other normally gaseous hydrocarbons which can be utilized include ethane, ethylene, propylene, butane, isobutane, or mixtures thereof. It is also within the scope of the invention to utilize normally liquid hydrocarbons such as those previously listed as solvents, but the use of such solvents does not permit chilling of the waxy oil by evaporation of the solvent as explained above in the case of normally gaseous hydrocarbons. The cooled solution of oil dissolved in liquid propane containing crystalline wax is withdrawn from chiller 39 through line 41 and passed to the rotary filters of Figures 1 and 3 or introduced directly into the crystal purification column in the case of Figure 2. A stream comprising oil dissolved in liquid propane is recovered from the crystal purification columns of Figures 1, 2 or 3 and is then sent to a means for separating the oil and propane. Thereafter, the practice of the process proceeds as explained in conjunction with Figures 1, 2 and 3.

As will be evident to those skilled in the art various modifications of this invention can be made or followed in the light of the foregoing disclosure and discussion without departing from the spirit or scope of the invention.

I claim:

1. A process for the separation and purification of wax-oil mixtures which comprises cooling a waxy oil containing a pour depressant dissolved therein to a sufficiently low temperature to crystallize the wax contained therein; passing the resulting slurry into a purification zone; recovering a stream of substantially wax-free oil from said purification zone, thereby forming therein a mass of wax crystals; moving said mass of wax crystals through said purification zone; melting said wax crystals in a portion of said purification zone; passing at least a portion of the resulting melt as a reflux stream through said moving mass of crystals so as to wash occluded material from said wax crystals; recovering said reflux stream containing pour depressant from said purification zone; and removing purified wax product from said purification zone.

2. A process for the separation and purification of wax-oil mixtures which comprises cooling a waxy oil containing a pour depressant dissolved therein to a sufficiently low temperature to crystallize substantially all of the wax contained therein; passing the resulting slurry into a purification zone; flowing said slurry into a first filter zone positioned in the upstream end crystalwise of said purification zone; withdrawing from said first filter zone a stream of wax-free oil, thereby forming a mass of wax crystals within said purification zone; moving said mass of wax crystals through said purification zone toward a melting zone maintained in the downstream end crystalwise of said purification zone at a temperature sufficiently high to melt said wax crystals; melting said wax crystals in said melting zone; displacing a portion of the resulting melt as a reflux stream countercurrently to said moving mass of wax crystals so as to intimately contact said wax crystals; withdrawing a stream comprising oil and pour depressant from a second filter zone disposed in said purification zone downstream crystalwise from said first filter zone; withdrawing a stream comprising wax and oil from a third filter zone disposed in said purification zone downstream crystalwise from said second filter zone; and recovering the remainder of the melt from said melting zone as high purity wax.

3. The process of claim 2 wherein the liquid streams withdrawn from the second and third filter zones are recycled to the cooling step.

4. A process for the separation and purification of wax-oil mixtures which comprises cooling a waxy oil to a sufficiently low temperature to crystallize substantially all of the wax contained therein; passing the resulting slurry into a purification zone; flowing said slurry into a first filter zone positioned in the upstream end crystalwise of said purification zone; withdrawing a stream of wax-free oil through a filter screen positioned in said first filter zone, thereby forming a mass of wax crystals within said purification zone; moving said mass of wax crystals through said purification zone toward a melting zone maintained in the downstream end crystalwise of said purification zone at a temperature sufficiently high to melt said wax crystals; slowly and continuously stirring said mass of wax crystals within said purification zone; melting said wax crystals in said melting zone; displacing a portion of the resulting melt as a reflux stream countercurrently to said moving mass of wax crystals so as to intimately contact said wax crystals; withdrawing a stream comprising wax and oil through a filter screen positioned in a second filter zone disposed downstream crystalwise from said first filter zone; continuously scraping the filter screens in said first and second filter zones so as to permit free passage of liquid therethrough; and recovering the remainder of the melt from said melting zone as high purity wax.

5. A process for the separation and purification of waxy-oil mixtures which comprises cooling a waxy oil containing a dissolved pour depressant to a sufficiently low temperature to crystallize substantially all of the wax contained therein; passing the resulting slurry into a purification zone; flowing said slurry into a first filter zone positioned in the upstream end crystalwise of said purification zone; withdrawing a stream of wax-free oil through a filter screen positioned in said first filter zone, thereby forming a mass of wax crystals within said purification zone; moving said mass of wax crystals through said purification zone toward a melting zone maintained in the downstream end crystalwise of said purification zone at a temperature sufficiently high to melt said wax crystals; slowly and continuously stirring said mass of wax crystals within said purification zone; melting said wax crystals in said melting zone; displacing a portion of the resulting melt as a reflux stream countercurrently to said moving mass of wax crystals; withdrawing a stream comprising oil and pour depressant through a filter screen positioned in a second filter zone disposed downstream crystalwise from said first filter zone; withdrawing a stream comprising oil and wax through a filter screen positioned in a third filter zone disposed downstream crystalwise from said second filter zone; continuously scraping the filter screens in said filter zones so as to permit free passage of liquid therethrough; and recovering the remainder of the melt from said melting zone as high purity wax.

6. A process for the separation and purification of wax-oil mixtures which comprises cooling a waxy oil containing a dissolved pour depressant to a sufficiently low temperature to crystallize substantially all of the wax contained therein; separating the crystalline wax from the oil; washing said crystalline wax with a solvent; passing said crystalline wax containing oil and solvent into a purification zone; withdrawing from a first filter zone positioned in the upstream end crystalwise of said purification zone a stream comprising oil and solvent; moving said crystalline wax through said purification zone toward a melting zone maintained in the downstream end crystalwise of said purification zone at a temperature sufficiently high to melt said crystalline wax; slowly and continuously stirring said crystalline wax within said purification zone so as to maintain a uniform mass of wax crystals; melting said wax crystals in said melting zone; displacing a portion of the resulting melt as a reflux stream countercurrently to the moving mass of wax crystals; withdrawing a stream comprising oil and pour depressant from a second filter zone disposed in said purification zone downstream crystalwise from said first filter zone; withdrawing a stream comprising wax and oil from a third filter zone disposed in said purification zone downstream crystalwise from said second filter zone; and recovering the remainder of the melt from the downstream end of said purification zone a high purity wax.

7. The process of claim 6 wherein the liquid streams withdrawn from the second and third filter zones are recycled to the cooling step.

8. A process for the separation and purification of wax-oil mixtures which comprises dissolving a waxy oil and pour depressant in a liquefied normally gaseous hydrocarbon solvent; passing the resulting solution into a chilling zone; cooling said solution to a sufficiently low temperature to crystallize substantially all of the wax by evaporating a portion of the solvent; passing the resulting slurry into a purification zone; flowing said slurry into a first filter zone positioned in the upstream end crystalwise of said purification zone; withdrawing a stream comprising oil and solvent through a filter screen positioned in said first filter zone, thereby forming a mass of wax crystals within said purification zone; moving said mass of wax crystals through said purification zone toward a melting zone maintained in the downstream end crystalwise of said purification zone at a temperature sufficiently high to melt said wax crystals; slowly and continuously stirring said mass of wax crystals within said purification zone; melting said wax crystals in said melting zone; displacing a portion of the resulting melt as a reflux stream countercurrently to said moving mass of wax crystals so as to intimately contact said wax crystals; withdrawing a stream comprising oil and pour depressant through a filter screen positioned in a second filter zone disposed downstream crystalwise from said first filter zone; withdrawing a stream comprising wax and oil through a filter screen positioned in a third filter zone disposed downstream crystalwise from said second filter zone; continuously scraping the filter screens in said filter zones so as to permit free passage of liquid therethrough; and recovering the remainder of the melt from said melting zone as high purity wax.

9. A process for the separation and purification of wax-oil mixtures which comprises cooling a waxy oil containing a pour depressant dissolved therein to a sufficiently low temperature to crystallize wax contained therein; passing the resulting slurry into a purification zone; recovering a stream of substantially wax-free oil from said purification zone, thereby forming therein a mass of wax crystals; moving said mass of wax crystals through said purification zone; melting said wax crystals in a portion of said purification zone; passing at least a portion of the resulting melt as a reflux stream through said moving mass of crystals so as to wash occluded material from said wax crystals; recovering said reflux stream containing pour depressant from said purification zone; withdrawing a stream comprising wax and oil from said purification zone downstream crystalwise from the locus of recovery said reflux stream; and removing purified wax product from said purification zone.

10. Apparatus for the purification of wax which comprises, in combination, a stepped crystal purification column comprising a series of tubular members having progressively larger diameters; means for introducing crystals into the small end of said column; filtering means disposed in said tubular members; means for melting crystals in the large end of said column; outlet means for withdrawing liquid from said large end of said column; a rotatable shaft axially disposed within said column; stirrer rods attached to and spaced apart along the length of said shaft below said filtering means; and scraper blades attached to said shaft above said stirrer rods, said blades being adapted to prevent the clogging of said filtering means with crystals.

11. Apparatus for the purification of wax which comprises in combination, an upright, elongated tube closed at its lower end; means for introducing crystals into said tube intermediate its ends; a floating roof filter comprising a filter screen disposed in the upper end portion of said tube; a liquid outlet line extending into said tube above said roof filter; stops attached to the walls of said tube above said crystal introduction means; means for melting crystals in the lower end of said tube; outlet means connected to the lower end of said tube; a rotatable shaft axially disposed within said column; stirrer rods attached to and spaced apart along the length of said shaft below said filtering means; and scraper blades attached to said shaft above said stirrer rods, said blades being adapted to prevent the clogging of said filtering means with crystals.

12. Apparatus for the purification of wax which comprises, in combination, a stepped crystal purification column comprising a series of tubular members having progressively larger diameters; means for introducing crystals into the small end of said column; filtering means disposed in said tubular members; means for preventing the clogging of said filtering means with crystals; means for stirring crystals in said column; means for melting crystals in the large end of said column; and outlet means for withdrawing liquid from said large end.

13. Apparatus for the purification of wax which comprises, in combination, an upright, elongated tube closed at its lower end; means for introducing crystals into said tube intermediate its ends; a floating roof filter comprising a filter screen disposed in the upper end portion of said tube; a liquid outlet line extending into said tube above said roof filter; stops attached to the walls of said tube above said crystal introduction means; at least one filtering means disposed in said tube below said crystal introduction means; means for preventing the clogging of said filtering means with crystals; means for melting crystals in the lower end of said tube; outlet means connected to the lower end portion of said tube; and means for stirring crystals in said tube upstream crystalwise of said melting means.

References Cited in the file of this patent

UNITED STATES PATENTS

| | | |
|---|---|---|
| 2,229,659 | Carr | Jan. 28, 1941 |
| 2,540,083 | Arnold | Feb. 6, 1951 |
| 2,540,977 | Arnold | Feb. 6, 1951 |
| 2,608,518 | Greene | Aug. 26, 1952 |
| 2,617,274 | Schmidt | Nov. 11, 1952 |
| 2,622,114 | Carney | Dec. 16, 1952 |
| 2,637,749 | Aston et al. | May 5, 1953 |
| 2,683,178 | Findlay | July 6, 1954 |